United States Patent [19]

Arzenti et al.

[11] Patent Number: 4,876,871
[45] Date of Patent: Oct. 31, 1989

[54] FLEXIBLE HARDROLL MANDREL ASSEMBLY FOR SLEEVING PERIPHERALLY LOCATED HEAT EXCHANGER TUBES

[75] Inventors: Thomas E. Arzenti, Hempfield Township; Robert D. Senger, Unity Township, both of Westmoreland County, Pa.

[73] Assignee: Westinghouse Electric Corp., Pittsburgh, Pa.

[21] Appl. No.: 250,737

[22] Filed: Sep. 29, 1988

[51] Int. Cl.⁴ ............................................. B21D 39/10
[52] U.S. Cl. ......................................... 72/122; 29/727
[58] Field of Search ..................... 72/122, 123; 29/727

[56] References Cited

U.S. PATENT DOCUMENTS

| | | | |
|---|---|---|---|
| 1,530,381 | 3/1925 | Leedom | 72/123 |
| 3,628,227 | 12/1971 | Blackburn et al. | 72/123 |
| 4,196,609 | 4/1980 | Sugino et al. | 72/122 |
| 4,232,442 | 11/1980 | Brunaud | 72/122 |
| 4,616,496 | 10/1986 | Hawkins . | |
| 4,716,753 | 1/1988 | Martin | 72/122 |

Primary Examiner—Lowell A. Larson

[57] ABSTRACT

A flexible hardrolling mandrel for expanding a sleeve within a tube of a nuclear steam generator is disclosed herein. The flexibility of the tool facilitates the insertion of the tool into tubes of the nuclear steam generator that have only a limited accessibility, and the tool is designed to transfer sufficient torque as required for hardrolling by way of the flexible design. Generally, the hardroll mandrel assembly includes an elongate housing with flex joints along its length, a roller cage rotatably mounted to the housing supporting at least one roller, a tapered actuator shaft slidable within the roller cage to extend the roller, a flexible inner shaft connected to the actuator shaft and drivingly connected to the housing near the roller cage, and an end effector and drive device for imparting torque to the housing. The driving torque is then transferred from the housing to the flexible inner shaft at the end thereof to drive the tapered actuator shaft, thereby providing the required hardrolling torque and minimizing the torque losses associated with flexible drive shafts.

28 Claims, 7 Drawing Sheets

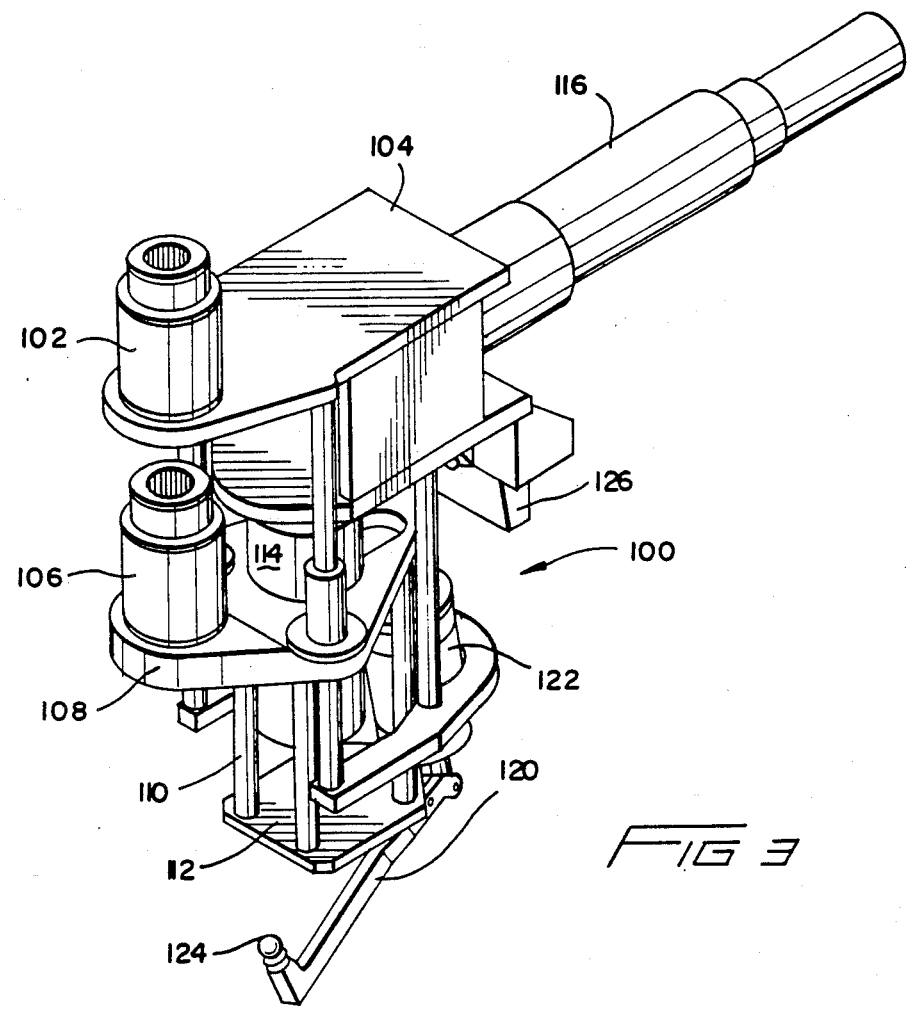

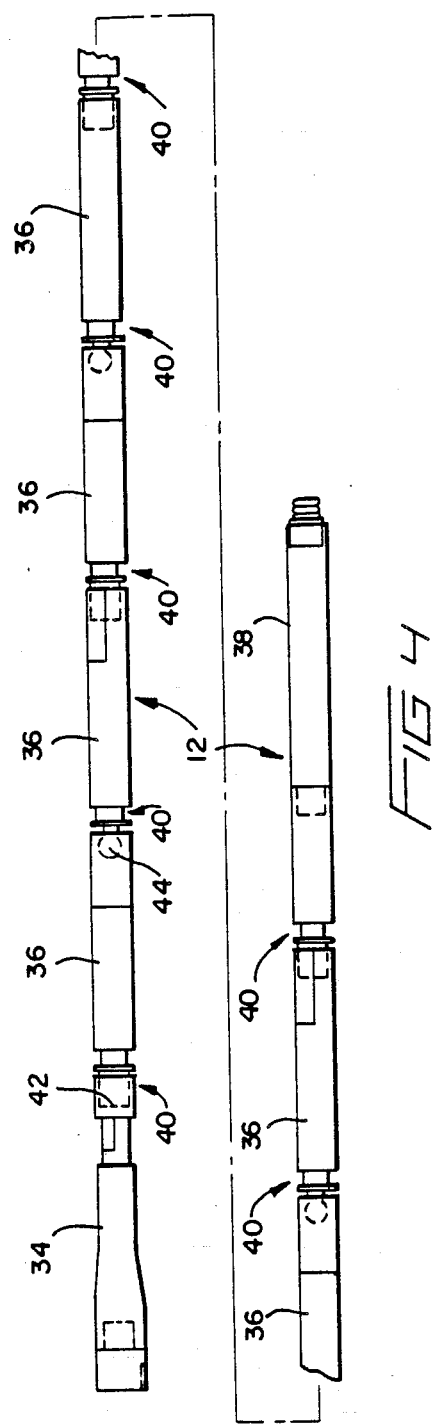
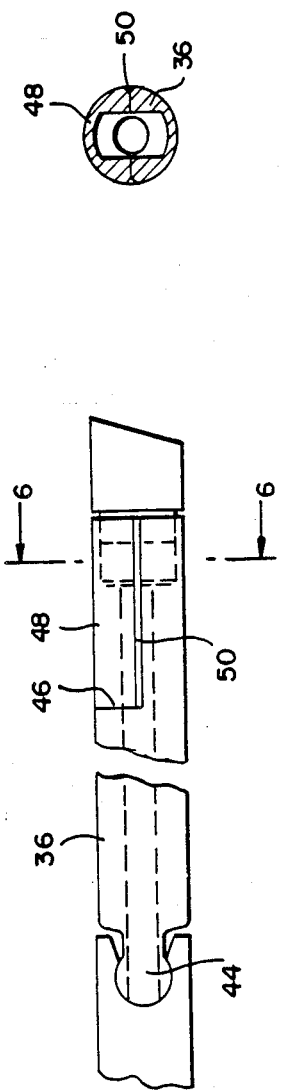

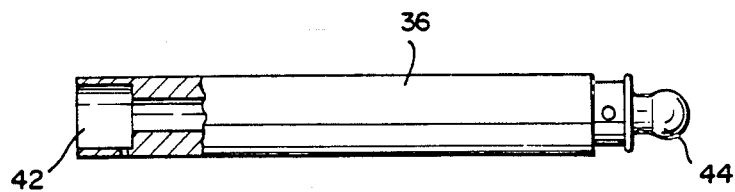
FIG 9
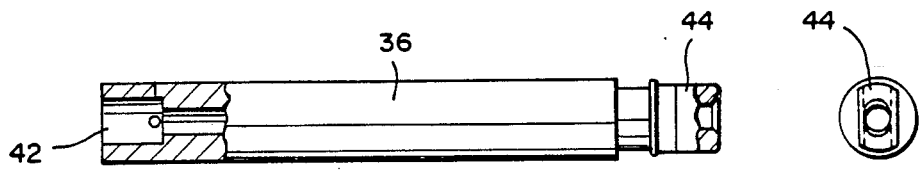 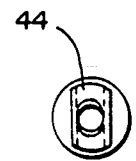
FIG 10   FIG 11
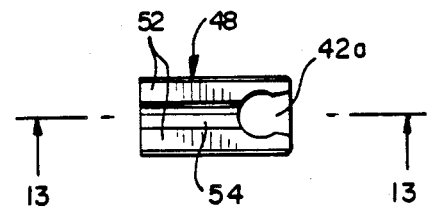
FIG 12
FIG 13   FIG 14

FLEXIBLE HARDROLL MANDREL ASSEMBLY FOR SLEEVING PERIPHERALLY LOCATED HEAT EXCHANGER TUBES

BACKGROUND OF THE INVENTION

1. Field of the Invention

The present invention relates to a tool for mounting a reinforcing sleeve within a tube by hardrolling or expanding a portion of the sleeve into engagement with the tube walls. It is particularly useful in mounting sleeves within the heat exchanger tubes of a nuclear steam generator which are located in the peripheral regions of the steam generator channelhead where minimum clearance exists.

2. Description of the Prior Art

Tools for expanding a sleeve within a steam generator heat exchanger tube to form a leak limiting mechanical joint are generally known in the prior art. Such tools include a rotatable roller cage which holds a plurality of radially extendible rollers captured within pitched slots, and a rotatable tapered mandrel which is slidably movable within a centrally disposed bore in the cage. The roller cage is rotatably mounted to a long outer shaft which houses a rotatable inner shaft that is connected to the tapered mandrel at the end nearest the roller cage. A drive means is also provided to transmit rotational torque to the inner shaft and thus the tapered mandrel, as well as to axially move the tapered mandrel into engagement with the axially extendible rollers captured within the pitched slots of the roller cage.

In operation, the reinforcing sleeve is first inserted within the tube to be repaired and axially slided into a position where the ends of the sleeve bridge the damaged portion of the tube. Next, the roller cage of the expansion tool is inserted into the open end of the tube and inside of the sleeve to be expanded, and positioned adjacent to one end of the sleeve. At this juncture, the tapered mandrel is applying no radial force on the rollers captured within the cage, so the sleeve walls push the rollers into a radially retracted position within the slots in the roller cage. Next, the tapered mandrel is simultaneously rotated and biased toward the interior of the tube. The resulting axial movement of the tapered mandrel causes it to engage and to radially extend the rollers (which are somewhat loosely held within tapered slots within the cage body) until they engage the interior surface of the sleeve to be expanded. Once the rollers are radially extended into such engagement, the outer surfaces of the rollers become simultaneously frictionally engaged between the inner walls of the sleeve, and the outer surface of the rotating tapered mandrel. Such frictional engagement allows the tapered mandrel to simultaneously rotate the rollers within their respective cage slots, and orbit the rollers around the axis of rotation of the mandrel. Because the slots which receive these rollers are pitched at a small angle relative to the axis of rotation in the mandrel, the rotation and the orbiting of the rollers draws the mandrel within the open end of the tube in what may be generally described as a screwing or feeding motion, which, in turn, radially extends the rollers further and expands the sleeve into engagement with the inner wall of the tube.

Such tools have been useful in the repair of heat exchanger tube s in nuclear steam generators. Unfortunately, the usefulness of such tools has been limited to only those heat exchanger tubes in the middle portion of the tubesheet of the generator which are easily reached and not interfered with by the bowl-shaped walls of the primary side of the generator. In order to more clearly understand the limitation on the above noted tools, some basic understanding of the structure and function of a nuclear steam generator is necessary.

Nuclear steam generators generally comprise a secondary side, a tube sheet, and a primary side which circulates water heated from a nuclear reactor. An example of such a generator is disclosed in U.S. Pat. No. 4,262,402 assigned to Westinghouse Electric Corporation, the assignee of the present invention. The secondary side of the generator includes a plurality of U-shaped tubes, as well as an inlet for admitting a flow of non-radioactive feed water. Both the inlet and outlet ends of the U-shaped tubes within the secondary side of the generator are mounted in a tube sheet which hydraulically separates the primary side of the generator from the secondary side. The primary side of the generator is bowl-shaped and includes a divider sheet which forms two quarter-sphere shaped channel heads that hydraulically isolate the inlet ends of the U-shaped tubes from the outlet ends. Hot, radioactive water flowing from the nuclear reactor is forceably pumped through the first side of the bowl-shaped primary side into the inlet ends of the U-shaped tubes. This hot, radioactive water flows through these inlets up through the tube sheet, and circulates around the U-shaped tubes which extend within the secondary side of the generator. The water transfers its heat through the walls of the U-shaped tubes to the non-radioactive feed water flowing through the secondary side of the generator, thereby converting this feed water into non-radioactive steam which, in turn, powers the turbines of an electric generator. After the water from the reactor circulates through the U-shaped tubes, it flows back through the tube sheet, through the outlets of the U-shaped tubes and into the outlet section of the bowl-shaped primary side where it is recirculated back to the nuclear reactor.

The walls of the U-shaped heat exchanger tubes in such a nuclear steam generator can suffer any number of different forms of corrosion, degradation, denting, stress corrosion cracking, intragranular attack, and pitting. In order to repair the walls of the heat exchange tubes that have been corroded, a sleeve is inserted into a steam generator tube in concentric relationship with the inner walls of the tube to bridge the corroded or damaged length of the tube. To effectively bridge the damaged area, the sleeve must be sealed at the upper and lower ends thereof to the tube to form a leak limiting mechanical joint. Various lengths of sleeves can be used depending upon the length of the defect as well as the distance of the defect above the tube sheet.

The sleeves must be inserted through the tube sheet from the primary side of the steam generator. Because the sleeves and the rolling tools which expand them are rigid, the length of the sleeves and tools which can be inserted into the heat exchanger tubes is limited by the clearance provided between the bowl-shaped walls of the primary side and the tube sheet. Such clearance is relatively small in the peripheral regions of the tube sheet where the bowl-shaped walls curve inwardly and immediately under the tubesheet. While a relatively short sleeve could be inserted into the peripherally located tubes, there is no prior art rolling mandrel known to applicants that could be used to effectively and conveniently seal the upper and lower ends of the sleeve to the tube due to the insufficient clearance within the channel head for such prior art sleeve rolling tools to perform the rolling and expanding functions.

Flexible drive shafts per se are well known. It is also known to use a flexible drive shaft on a steam generator for the insertion of a tool into the tube sheet in the peripheral region of the channel head. These known devices, however, are not concerned with tools utilizing the large torques required by a rolling tool, but instead are used in tools requiring minimal torques, such as a rotopeening apparatus. A known example of a flexible drive shaft and rotopeening apparatus is disclosed in U.S. Pat. No. 4,616,496 to Hawkins, also assigned to Westinghouse Electric Corporation, the assignee of the present invention. This apparatus includes a flexible driven inner shaft which is strong enough to transmit sufficient torque for the driven rotopeening elements, but which would be entirely insufficient to drive a hard rolling mechanism to expand and seal a sleeve. Note that the outer housing is also rotatably driven, but the outer housing is only rotated slightly relative to the inner shaft and is not used as a torque transfer member.

In order to effectively join a sleeve within a heat exchanger tube, a rolling tool is required which expands the tube beyond its elastic limit and seals the sleeve to the tube. Large torques are required for this purpose. In view of the limited diametrical space afforded by a typical steam generator tube, (which is typically only about 0.875 inches in diameter), a flexible drive shaft as is known would not be able to transmit sufficient torque to the mandrel of a rolling tool to expand a sleeve within the tube and seal the sleeve to the tube, thus adequately bridging a repair area in the steam generator tubing.

Clearly, there is a need for a rolling tool capable of expanding and sealing a sleeve to a peripherally located steam generator heat exchanger tube. Such a tool should also be simple, reliable, remotely controllable and compact for easy manipulation and use within the primary side of the generator.

SUMMARY OF THE INVENTION

It is the primary object of the present invention to provide a rolling tool apparatus which overcomes the above noted deficiencies in the prior art. In its broadest sense, the invention is a hard rolling tool apparatus which is capable of expanding a sleeve within a generator tube that is located within the peripheral region of the tubesheet. The apparatus generally comprises a flexible mandrel assembly including a roller cage, rollers, and a tapered actuator shaft, and an end effector and drive means for advancing the mandrel into a generator tube and for rotationally driving the mandrel.

The mandrel assembly further includes an elongate outer housing provided with flexure means along the length thereof and a flexible inner shaft within the outer housing for shifting the tapered actuator and for translating rotational drive from the outer housing to the tapered actuator. Additionally, the outer housing is connected to the inner shaft near or adjacent to the connection between the outer housing and the roller cage assembly. This connection between the outer housing and the inner shaft provides the transfer of rotational drive from the outer housing to the inner shaft but permits axial sliding between the inner shaft and the outer housing.

The rotational drive and torque transfer sequence of the present apparatus is described as follows: First, the end effector and drive means supplies the rotational driving force which is transmitted directly to the outer housing at one end thereof. Next, the outer housing (which is provided with flexure joints therealong) transmits the rotational drive torque to the flexible inner shaft at a second end of the outer housing, which also rotatably supports the roller cage. Lastly, the rotational torque is transferred from the inner shaft to the tapered actuator shaft. As the tapered actuator shaft is rotated via the aforementioned sequence, the inner flexible shaft is moved axially, thus axially sliding the tapered actuator shaft which in turn engages the rollers and frictionally orbits and radially extends them with respect to the roller cage. The radial extension of the rollers cause the torque to be directed to the sleeve within a tube which is consequently expanded to sealingly engage the internal surface of the tube.

In order to remove the mandrel assembly from within a tube, a reverse rotational driving force is transmitted to the outer housing and the actuator shaft. To further facilitate the removal, an axial force is applied to the inner shaft in the opposite direction as applied to radially extend the rollers to thereby permit the rollers to retract into the roller case, thereby allowing the mandrel assembly to be removed. If a reverse axial force was not imparted to the flexible inner shaft and the tapered actuator, the mandrel assembly would tend to unscrew itself with the rollers still extended, thus lengthening the area deformed by the rollers. To facilitate this reverse axial shift, an air cylinder is provided at the first end of the outer housing which engages therewith and also with an end adaptor of the inner flexible shaft to pull the tapered actuator shaft to retract the rollers.

The end effector and drive means not only provides the rotational drive torque to the outer housing, but it also includes an advancing means including two selectively actuable grippers, at least one of which is reciprocately movable with respect to the other for advancing the flexible mandrel into the open tube end. The grippers may include expandible bladders for selectively gripping and ungripping the flexible housing of the mandrel. Further, the stationary gripper may include a drive means provided adjacent to an opening on one side of the gripper for imparting rotational torque to the outer housing from the end effector.

The apparatus of the present invention provides a flexible hardroll mandrel tool assembly for expanding a sleeve within a peripherally located tube which can supply the torque necessary to expand the sleeve within the tube.

BRIEF DESCRIPTION OF THE DRAWINGS

FIG. 3 is a perspective view of the preferred embodiment of the end effector of the inventive apparatus;

FIG. 4 is a side view of the outer housing and flexure joints of the apparatus illustrated in FIG. 1;

FIG. 5 is a close-up view of the one of the links shown in FIG. 4;

FIG. 6 is a cross-section taken along the line 6—6 of FIG. 5;

FIG. 9 is a partial cross section of a side view of one of the links of the present invention;

FIG. 10 is a similar view as shown in FIG. 9 rotated by 90°;

FIG. 11 is an end view of the link shown in FIG. 10;

FIG. 12 is a planned view of a cover element of the present invention;

FIG. 13 is a cross section through line 13—13 of FIG. 12;

FIG. 14 is an end view of the cover element shown in FIG. 13 from the right side;

DETAILED DESCRIPTION OF THE PREFERRED EMBODIMENT

Figure 1:
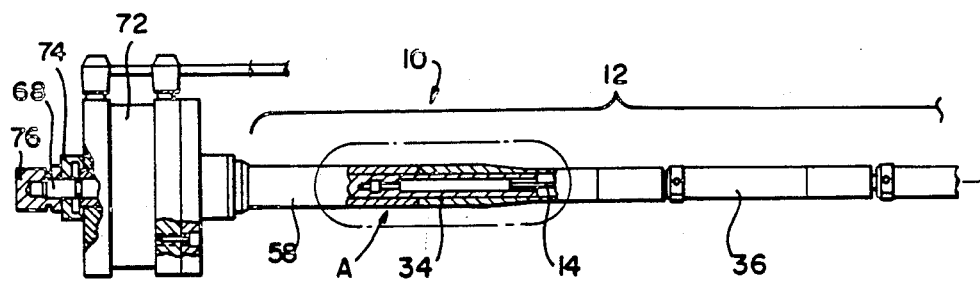
FIG. 1 is a side view and partial cross-section of the flexible mandrel assembly of the present invention.

With reference now to FIG. 1, wherein like numerals represent like parts of the invention, the improved hardroll mandrel assembly of the invention includes a mandrel assembly 10 generally comprising an elongate outer housing 12, an inner flexible shaft 14, a roller cage 16 rotatably mounted to the distal end of the outer housing 12, described further below, and a tapered actuator shaft 18 supported in an longitudinal opening through roller cage 16 which is slidable in the axial direction of the mandrel. Rollers 20, of which any number thereof can be chosen, are disposed within pitched slots 22 of the roller cage 16. The number of slots 22 is equal to the number of rollers 20, which in the preferred embodiment is four.

Figure 2:
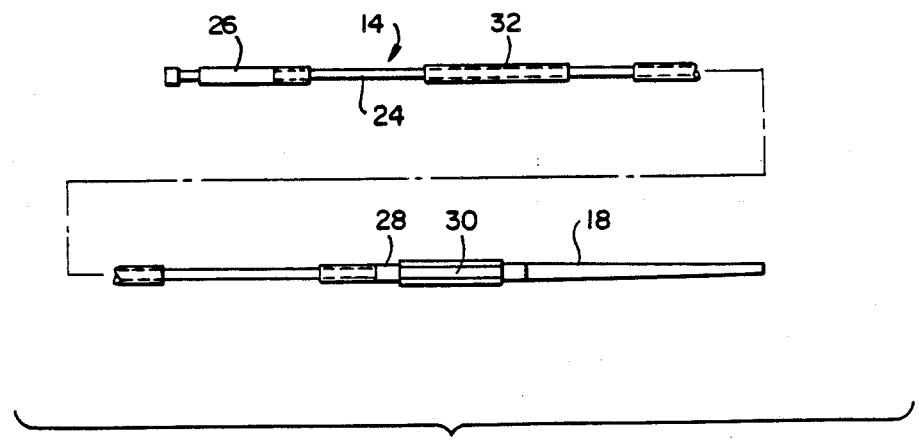
FIG. 2 is a side view of the flexible inner shaft and tapered actuator of the present invention.

The inner flexible inner shaft 14 is illustrated in detail in FIG. 2. The flexible inner shaft 14 includes a flexible cable 24 which can consist of any well known flexible drive cable made of metal, plastic or the like. A first cable adaptor 26 is connected to one end of the cable 24, and a second cable adaptor 28 is secured to the other end of the cable 24. The cable adaptor 28 is also fixedly secured to the tapered actuator shaft 18, whereas the cable adaptor 28 and the actuator shaft 18 can be formed as a single element or as plural elements secured together in a conventional manner, for example, by brazing or welding. Flexible shaft 14 is also provided with rigid non-flexing cable sleeves 32 secured to the cable 24 at intermittent lengths with a predetermined spacing which coincides with the spacing of the flexure joints along the outer housing 12. While the cable sleeves 32 can be formed of any rigid material, a metal sleeve capable of being brazed to the cable 24 is preferable.

With reference to FIGS. 4-6 and 9-19, the elongate outer housing 12 is comprised of a drive link 34 to be rotatably driven as further amplified below, a plurality of flex links 36, the number of which determines the axial length of the mandrel and the length of insertion of the mandrel within a tube of the steam generator, and a cage extension 38. Each of the flex links 36, as well as the drive link 34 and cage extension 38, are provided with an central axial opening in order to facilitate the passage of the inner flexible shaft 14 therein. Ball and socket flex joints 40 are provided along the length of the outer housing 12, thereby making the outer housing flexible, and permitting insertion of the outer housing into a tube of a steam generator which has limited accessibility. In particular, a ball and socket 40 is provided between the drive link 34 and the first flex link 36, between each of the successive flex links 36 and between the last flex link 36 and the cage extension 38. As shown in FIG. 4, the drive link 34 includes a socket 42 into which a ball of the first link 36 is inserted. Each flex link 36 includes a ball 44 on one end thereof, and a socket 42 on its outer end. The cage extension 38 includes a ball 44 which is inserted into the socket 42 of the last flex link 36. The ball and socket joints 40 are sequentially arranged such that every other ball and socket joint is rotated by 90° with respect to the previous joint. This staggered flex arrangement can be done because the balls 44 and sockets 42 are designed to permit pivotal movement in only a single plane. This staggered direction of the ball rotation allows for more flexibility of the mandrel assembly 10 during insertion into the sleeve of a steam generator. The design of the ball and socket joints 40 not only facilitates pivotal movement in a single plane, but also effectively transmits torque between the various links of the outer housing. As shown in FIGS. 9-11, the ball 44 is elongated in a direction perpendicular to the longitudinal axis of the link 36, thereby providing a single pivotal direction as well as the necessary torque transfer. The sockets 42 are rotated by 90° about the longitudinal axis with respect to the balls 44 to facilitate the insertion of a ball on an adjacent link.

In order to capture the ball of one link within a socket of an adjacent link, each of the links 36 have a cut-out 46 along its actual length at the socket end thereof, thereby exposing the socket 42 for insertion of the ball 44. After a ball is inserted into the socket, a link cap 48 is secured to the links 36 to thereby envelope the ball 44 within socket 42. The cut-out 46 with a link cap 48 attached to a link 36 is clearly illustrated in FIGS. 5 and 6. The link caps 48 are preferably welded in place as shown by welding seams 50.

One of the link caps 48 is more clearly detailed in FIGS. 12-14. The link cap 48 in FIG. 12 includes two flat portions 52 which abut the cut-out portion 46 of the link 36 and are welded thereto, an arc portion 54 defining a segment of the central longitudinal opening through each link 36, and a socket portion 42a defining the side of a socket for capturing a ball therein. FIG. 13 illustrates a cross-section through line 13—13 of FIG. 12 showing the difference in depth between the portions 42a and 54, as well as the general curved nature of the cap 48.

Figure 15:
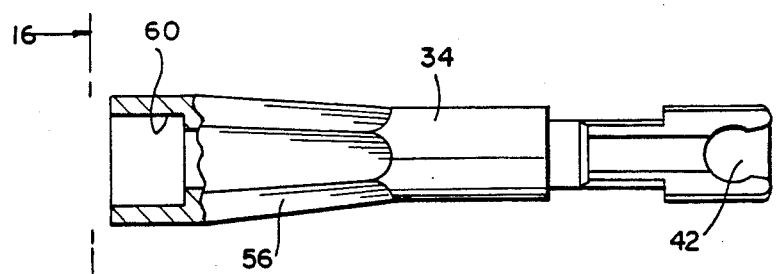
FIG. 15 is a partial cross section side view of the drive link of the present invention.
Figure 16:
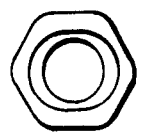
FIG. 16 is an end view taken from the left side of FIG. 15.
Figure 17:
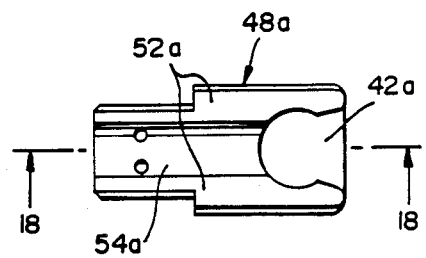
FIG. 17 is a modified cover element used with the link of FIG. 15.
Figure 18:
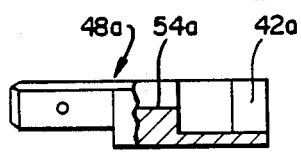
FIG. 18 is a partial cross section through line 18—18 of FIG. 17.
Figure 19:
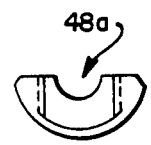
FIG. 19 is a right end view of the cover element of FIG. 18.

Drive link 34 will now be more clearly described with reference to FIGS. 15 and 16. The drive link 34 is provided with a tapered hexagonally shaped surface 56 which extends along a portion of the longitudinal length. The surface 56 is tapered from a lesser radius to a greater radius of the link in the direction of the link 34 away from the socket 42. The taper of surface 56 facilitates the insertion of the drive link 34 into a drive means, described below, as inserted from the socket end. The hex shape of the surface 56 permits a rotatable drive torque to be effectively transmitted to the drive link. FIG. 16 illustrates that the hex surface 56 extends entirely to the end of the drive link 34 opposite to the socket 42, as viewed from line 16—16. A link cap 42a is illustrated in FIGS. 17-19, which is a modified version of the link cap previously described because the drive link shown in FIG. 15 includes a reduced diameter portion which is likewise reflected in the cap 48a. As in the previously described link caps, similar flat abutment surfaces 52a are provided along with an arc portion 54a, providing a portion of the central opening and the socket portion 42a for closing the socket after a ball 44 is inserted therein. FIG. 18 shows a partial cross section through line 18—18 of FIG. 17 illustrating the difference in depth between the arc portion 54a and the socket portion 42a, and FIG. 19 provides an end view from the right side of FIG. 18 showing the generally curved nature of the link 48a.

Figure 8:
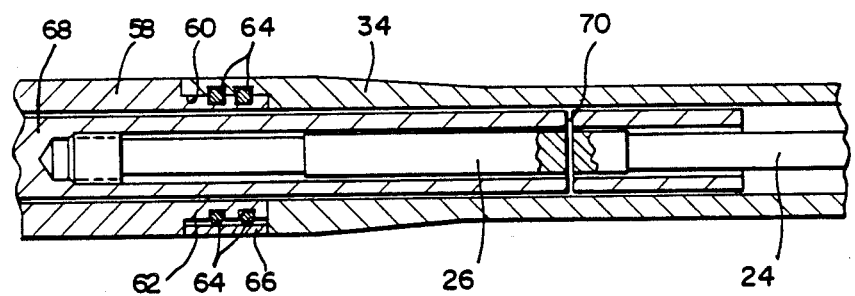
FIG. 8 is an enlarged cross section of the area within section A of FIG. 1.

Referring again to FIG. 1, drive link 34 is shown adjacent to a stationary link 58. This stationary link 58 is basically a continuation of the outer housing 12; however, it does not rotate with the drive link 34. In order to more clearly understand the connection of the stationary link 58 with the drive link 34, see FIG. 8 showing an enlarged version of the portion of the mandrel assembly 10 contained within section A of FIG. 1. The drive link 34 further includes an internal hollow 60 into which a reduced extension 62 of the stationary link 58 is inserted. The internal surface of the hollow 60 and the external surface of the reduced extension 62 are both machined with internal and external races respectively. The races are loaded with ball bearings, preferably 0.0625 chrome steel balls, which, together with the races, form a ball thrust bearing. The balls are retained in the races by a key 66. This arrangement permits the drive link 34 to rotate freely on stationary link 58 and to axially fix the drive link 34 to the stationary link 58.

Further with reference to FIG. 8, the cable 24 and the first end adaptor 26 are also illustrated within the drive link 34 and stationary link 58. The cable 24 is fixably secured to the end adaptor 26 and the end adaptor 26 is further fixed to an extension element 68. A typical manner of connecting the end adaptor 26 to the extension element 68 is effected by a pin such as shown at 70 within a bore through both elements. Various other methods can be used as conventionally known, such as welding or brazing. Extension element 68 extends entirely through the stationary link 58 of the outer housing and further through an air cylinder generally designated as 72, through a thrust bearing 74 and finally into a level pad 76 (see FIG. 1). The thrust bearing 74 and level pad 76 are fixed to the end of the extension element 68 such as by snap rings or other conventional means. The thrust bearing 74, as shown in FIG. 1, abuts against the side of the air cylinder 72 when the extension element 68 and and the flexible inner shaft 14 are shifted to a right-most position as viewed in FIG. 1, wherein the tapered actuator shaft 18 is likewise shifted to the right. The thrust bearing 74 not only limits the rightward movement of the flexible shaft 14, but also permits rotational movement between the end of the extension element 68 and the air cylinder 72, which reduces frictional contact. Thus, level pad 76 serves as an abutment member for an actuator described below for the purpose of shifting the flexible inner shaft and the tapered actuator shaft toward the right.

The air cylinder 72 is a conventional and commercially available air cylinder which expands in a direction along the axial length of the mandrel assembly, the purpose of which is to pull the flexible inner shaft 14 and the tapered actuator shaft 18 back from its extended position (which would be leftward as viewed in FIG. 1), thus permitting the rollers 20 to be retracted within the roller cage 16. Appropriate air lines are connected to the cylinder 72 for the purpose of supplying and relieving air pressure which is remotely controlled to extend or retract the cylinder 72. Note that the cylinder 72 abuts the stationary link 58 of the outer housing and the thrust bearing 74 of the inner flexible shaft, thus accommodating the required pulling of the flexible inner shaft 14 within the outer housing 12.

Figure 7:
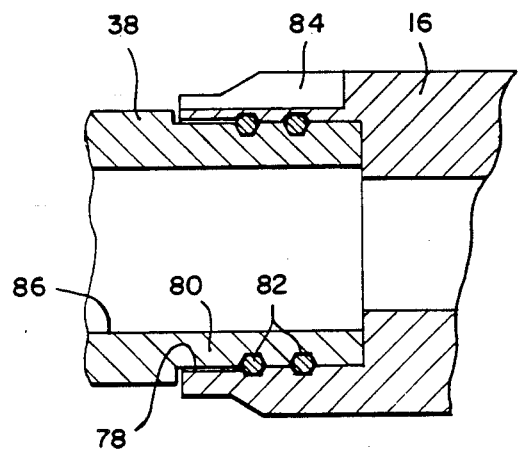
FIG. 7 is a cut-away cross-section along line 7—7 of FIG. 1.

The cage extension 38 rotatably supports the roller cage 16 for independent rotation of the roller cage 16 with respect to the cage extension 38. This rotatable connection is shown in cross-section in FIG. 7, which was taken along lines 7—7 in FIG. 1. The roller cage 16 has an interior hollow on an end thereof, into which is inserted a reduced extension 80 from the cage extension 38. The internal hollow 78 and the reduced extension 80 are machined with a pair of internal races and external races, respectively, between which ball bearings 82 are inserted which are preferably steel bearings similarly described at 64. This rotatable bearing connection provides a thrust bearing which axially limits the movement of the roller cage 16 from the cage extension 38. A key 84 is also provided within a slot in roller cage 16, thus permitting insertion and removal of the ball bearings 82.

The cage extension 38 includes an internal shaped surface 86 which conforms to the external shaft of the element 30 secured to the flexible inner shaft 14. See FIG. 2. Preferably, the external shape of the element 30 and the internal shape of the surface 86 are hexagonal. These conforming shapes effectively permit torque to be transferred from the outer housing 12 to the flexible inner shaft 14 at the point of the cage extension 38. In this manner, the cable portion 24 of the flexible inner shaft 14 is bypassed, thus negating any losses of torque transfer by way of the flexible cable drive shaft. Shaped element 30 is rigidly connected with the tapered actuator shaft 18, thereby directly transferring the torque imparted on element 30 to rotatable drive the actuator shaft 18. It is important, however, that the torque transmitting connection between the outer housing and the inner flexible shaft between surface 86 and shaped element 30 does not limit or hinder the axial movement of the flexible inner shaft 14 and actuator shaft 18 with respect to the outer housing 12. Such a connection is properly facilitated by an external and internal hexagonal shape on the aforementioned elements that extends in the axial direction of movement of the inner shaft 14.

Figure 20:
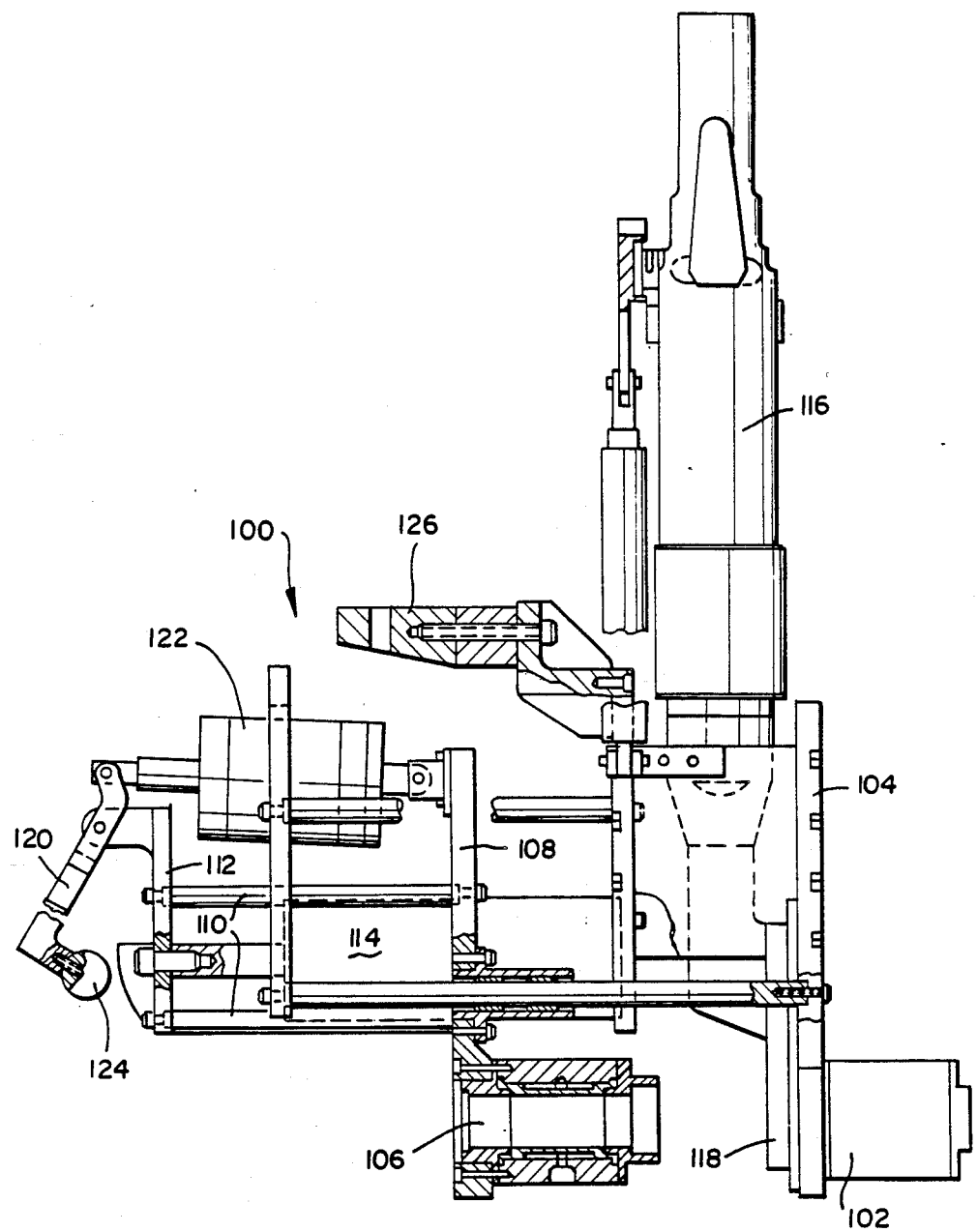
FIG. 20 is a side view in partial cross-section of the end effector illustrated in FIG. 3.

An end effector and drive device 100 which is used for advancing the mandrel assembly 10 within a tube of the steam generator and for imparting the initial rotational drive torque to the outer housing 12 will now be described with references to FIGS. 3 and 20. The end effector and drive device 100 basically comprises a stationary first gripper 102 mounted to a top plate 104 and a second gripper 106 which is mounted for reciprocal movement relative to the first gripper 102 by way of a sliding plate 108, poles 110, plate 112 and an air cylinder 114 connected between the movable plate 112 and the stationary top plate 104. Both the first and second grippers 102,106 are pneumatically controlled and include expandible bladders for selectively gripping and ungripping the outer housing of the mandrel assembly for advancing and inserting the mandrel assembly into a tube of a nuclear steam generator. The manner of advancement is described as follows: First, the second gripper 106 grips a portion of the outer housing of the mandrel assembly while the first gripper 102 is not activated; next, the air cylinder 114 is activated to move the second gripper 106 towards the first gripper 102, thereby pushing the mandrel assembly forward through the first gripper 102; next, the first gripper 102 is activated, the second gripper is released and the air cylinder is moved in reverse direction; lastly, the first gripper 102 is released and the second gripper 106 is again activated and a new cycle is started. By this method, the mandrel assembly can be advanced by the stroke distance of the cylinder 114 until a point when the mandrel assembly is completely inserted in a steam generator tube.

Further included on the end effector and drive device 100 is an air motor 116 and a nut setter 118 which is drivingly attached to the air motor 116. This air motor and nut setter is a conventional air tool item which can be obtained from Stanley Air Tools, a division of the Stanley Works of Cleveland, Ohio. The nut setter 118 is mounted on the lower end of the first gripper assembly 102, just under the plate 104, shown clearly in FIG. 20. The nut setter 118 includes a central opening aligned with the opening extending through the first and second grippers 102, 106, and the opening of the nut setter is hexagonally shaped. Preferably the air motor 116 is a reversible air motor. The internal hex of the nut setter 118 is dimensioned to conform with the tapered hex 56 on drive link 34. Thus when the mandrel assembly is completely inserted, the tapered hex 56 on the drive link 34 is brought into engagement with the internal hex of the nut setter 118, thereby drivingly engaging the air motor 116 to the outer housing 12 in an effective torque transmitting manner.

The end effector and drive device 100 also includes a lever arm 120 and an actuating cylinder 122 which are mounted to the movable unit of the second gripper 106. As shown in FIG. 20, expansion of the actuating cylinder 122 will close the lever arm 120 to pivot toward the second gripper 106. After the mandrel assembly 10 has been completely inserted within a steam generator 2 and the drive link 36 is positioned within the nut setter 118, the pivotal movement of the lever arm 120 will cause the ball element 124 on the end of arm 120 to engage with the level pad 76 of the mandrel assembly, thus transmitting axial movement to the extension element 68 of the flexible inner shaft 14. This, in turn, will shift the tapered actuator shaft 18, causing a radial extension of the rollers 20 for performing the hard rolling function. The actuating cylinder 122 can be operated in a manner so as to shift the tapered actuator shaft 18 at a desired rate, depending on the expansion of the actuating cylinder 122.

The end effector and drive device 100 also contains a wedge coupling 126 that is detachably connectable with a robotic arm that can be remotely controlled for manipulating the end effector and drive device 100 and mandrel assembly 10. A know n manipulator such as the SM-10WS robotic arm made by Zeter Corporation located in Isaquah, Wash. can be used for this purpose.

The hardroll mandrel assembly 10 and the end effector and drive device 100 are particularly useful in sleeving peripherally located heat exchanger tubes where mechanical clearances are minimal due to the bowl-shaped walls of the steam generator which curve under the tubesheet periphery. For this, the end effector and drive device 100 must be light enough for manipulation by a known delivery system and compact enough to be moved about within the confines of the channel head of the steam generator. Likewise, the mandrel assembly 10 must be flexible to permit insertion in tubes with limited accessibility and must be capable of transmitting sufficient torque to perform a hardrolling function. The size and weight restrictions, along with the flexible nature and torque transferring capabilities eliminates any hardroll end effector and mandrel designs known by applicants. While the present invention is particularly applicable to the peripheral regions of the tubesheet of a steam generator, it may also be used in the central regions of the steam generator channel head.

In operation, the flexible mandrel assembly 10 and the end effector and drive device 100 are introduced within the channel head of the primary side of a nuclear steam generator. The end effector and drive device 100 is remotely controlled from the aforementioned SM-10WS robotic arm (not shown) detachably secured at the connecting wedge 126. The end effector and drive device 100 preferably includes a T.V. camera which is also remotely controlled for permitting remote control. The end effector and drive device 100 is first fit over the rightmost end of the mandrel assembly 10 shown in FIG. 1, this being the roller cage 16 and tapered actuator shaft 18, until both grippers 102 and 106 are around the mandrel assembly 10. The grippers 102 and 106 are then sequentially activated in a hand-over-fist manner as previously described. This action takes place until the outer housing of the mandrel assembly 10 is entirely inserted within the tube which contains a sleeve. The last stroke of the second gripper 106 toward the first gripper 102 causes the tapered hex 56 on drive link 34 to be inserted into and drivingly engaged with the nut setter 118 provided with an internal hex. Thereafter, the second gripper 106 is reciprocated back to grip the stationary link 58 at the furthermost end thereof. The second gripper 100 thus is locked to the stationary link 58 to support the mandrel assembly 10 during the rolling operation. The drive link 34 and the ut setter 118 are now presently in position to begin the driving rotation of the outer shaft 12. Before rolling is begun, the lever arm 120 of end effector and drive device 100 is activated to a degree by the cylinder 122 which causes the ball 124 to engage the level pad 76 of the flexible inner shaft, thus imparting an axial shift to the flexible inner shaft 14. This preliminary movement of the flexible inner shaft 14 with respect to the flexible links of the outer housing 12 causes the rigid cable sleeves 32 to be moved from a position that is not interfering with the ball and socket flex joints 40 of the outer housing 12 to a position wherein the rigid cable sleeves bridge across the ball and socket joints 40, thus rigidifying the ball and socket links 40. This can be done because the ball and socket links 40 are utilized primarily for insertion and removal of the mandrel assembly to steam tubes which have a limited access. Once the flexible mandrel 10 is inserted within the tube to be repaired, there is no longer a need for flexing the shafts. The rigid cable sleeves 32 are long enough so that during the entire rolling operation while the tapered shaft 18 is moved to a completely actuated position, the rigid cable sleeves hold the ball and socket flex joints 40 rigid. Before the tapered actuator 18 is moved to an activation position, the rotation of the outer housing is initiated. Thus, the end effector and drive device 100, particularly at nut setter 118, imparts rotational torque to the drive link 34 at the tapered hex 56 and the torque transmitting ball and socket joints 40 transmit the torque from links 36 to cage extension 38. The cage extension 38 thereafter transfers the rotational drive torque from shaped internal surface 86 to the flexible inner shaft 14 at shaped hexagonal element 30 of the inner flexible shaft 14 which is rigidly secured to the tapered actuator shaft 18.

The hard rolling operation is then continued by the axial shifting of the inner shaft 14 caused by force generated from the actuating cylinder 122 on lever arm 120, pushing the level pad 76 and thus shifting the tapered actuator shaft 18 which in turn extends the rollers 20 from the slots 22 of the roller cage 16. Torque supplied from outer housing 12 at cage extension 38 to the tapered actuator shaft 18 is then frictionally transmitted to the rollers 20 as the rollers 20 engage a sleeve which is to be hardroll expanded, thus causing the rollers 20 to rotate and orbit about the tapered actuator shaft 18. This action causes a continued extension of the rollers 20 as the actuator shaft 18 is further moved until the sleeve expansion is completed.

Once the hardrolling operation has been completed and a hardroll joint has been effected, the mandrel assembly 10 must be removed. To implement this removal, the tapered actuator shaft 18 is axially pulled from its actuation position, thus permitting rollers 20 to retract within the roller cage 16. This pulling force is applied by acutating the air cylinder 72, thus performing a thrust against the thrust bearing 74 and level pad 76 secured to the extension element 68 of the inner flexible shaft 14. Thereafter, a reverse rotation is imparted to the drive link 34 by nut setter 18 by air motor 116. As previously mentioned, the air motor 116 is capable of reverse rotational driving torque as conventionally known. If the air cylinder 72 were not used prior to the reverse rotation, the mandrel assembly would try to unscrew itself from within the sleeve. The result of this unscrewing motion would be to elongate the hardrolled joint, which is undesirable. The mandrel assembly 10 is then pulled out completely by the grippers 102, 106 assembly of the end effector and drive device 100 in a reverse manner as used to insert the mandrel assembly 10, while doing a reverse roll on the mandrel.

We claim:

1. A flexible hardroll mandrel assembly for expanding a sleeve comprising:
   an elongate housing for transferring torque including at least one flexure means along the length thereof;
   a roller cage rotatably mounted to a first end of said elongate housing, including a roller rotatably mounted within a slot in said roller cage;
   a tapered actuator shaft axially slidably supported in an opening in said roller cage for radially extending, orbiting and rotating said roller;
   an end effector and drive means for rotatably driving said elongate housing, and
   a flexible inner shaft means within said elongate housing for axially shifting said tapered actuator shaft and for translating rotational drive torque from said elongate housing to said tapered actuator shaft.

2. A flexible hardroll mandrel assembly for expanding a sleeve, comprising:
   an elongate housing for transferring torque including at least one flexure means along the length thereof;
   a roller cage rotatably mounted to a first end of said elongate housing, including a roller rotatably mounted within a slot in said roller cage;
   a tapered actuator shaft axially slidably supported in an opening in said roller cage for radially extending, orbiting and rotating said roller;
   an end effector and drive means for rotatably driving said elongate housing;
   a flexible inner shaft within said elongate housing connected at one end to said tapered actuator shaft to shift said tapered actuator shaft in response to axial movement of said inner shaft; and
   a coupling means provided on an internal surface of said elongate housing which is slidably connected to said flexible inner shaft for translating rotational drive torque from said elongate housing to said flexible inner shaft and said tapered actuator shaft, while permitting said flexible inner shaft to shift axially within said elongate housing.

3. The flexible hardroll mandrel assembly of claim 2 wherein said coupling means is provided on said elongate housing adjacent to said first end thereof, thereby translating drive torque to said inner shaft near the connection of said flexible inner shaft and said tapered actuator shaft, thus minimizing torque losses due to said flexible inner shaft.

4. The flexible hardroll mandrel assembly of claim 3 wherein said coupling means includes a shaped surface on the inside of said elongate housing and a matingly shaped surface on an element of said inner shaft, which is fixedly connected to said tapered actuator shaft.

5. The flexible hardroll mandrel assembly of claim 2 wherein said elongate housing comprises a plurality of links including a drive link, at least one flex link and a cage extension, and wherein there is a flexure means between each link of said elongate housing.

6. The flexible hardroll mandrel assembly of claim 5 wherein said flexure means comprises a ball and socket flex joint wherein each said ball is elongated in a direction perpendicular to the longitudinal axis of said links, and each said socket is matingly shaped, thereby permitting pivotal movement in only a single plane.

7. The flexible hardroll mandrel assembly of claim 5 further including a stationary link for rotatably supporting and axially fixing said drive link thereto; wherein said flexible inner shaft also extends through said stationary link.

8. The flexible hardroll mandrel assembly of claim 7 including an expandible air cylinder provided to abut said stationary link and rotatably connected to another end of said flexible inner shaft for axially pulling said flexible inner shaft and said tapered actuator shaft, for permitting said roller to return within said roller cage after hardrolling is completed.

9. The flexible hardroll mandrel assembly of claim 7 wherein said end effector and drive means includes a stationary first gripper and a reciprocable second gripper for inserting said mandrel assembly in a sleeve to be expanded, said first gripper includes a nut setter which is driven by a motor means on said end effector for rotatably driving said drive link of said elongate housing.

10. The flexible hardroll mandrel assembly of claim 10 wherein said drive link includes an external tapered hex shaped surface to slide into and engage said nut setter for torque transfer.

11. The flexible hardroll mandrel assembly of claim 5 wherein said flexible inner shaft includes a plurality of non-flexing sleeves secured thereto of a number equal to the number of flexure means, and which are spaced to permit the inner shaft to flex during insertion and removal of the mandrel assembly, but which lock the flexure means during operation as the sleeves are shifted with the flexible inner shaft during operation.

12. A flexible hardroll mandrel assembly for expanding a sleeve, comprising:
   an elongate housing for transferring torque including at least one flexure means along the length thereof;
   a roller cage rotatably mounted to a first end of said elongate housing, including a roller rotatably mounted within a slot in said roller cage;
   a tapered actuator shaft axially slidably supported in an opening in said roller cage for radially extending, orbiting and rotating said roller;
   an end effector and drive means for rotatably driving said elongate housing;
   a flexible inner shaft within said elongate housing connected at one end to said tapered actuator shaft to shift said tapered actuator shaft in response to axial movement of said inner shaft; and
   a coupling means provided on an internal surface of said elongate housing adjacent to said first end thereof which is slidably connected to said flexible inner shaft near the connection of said flexible inner shaft to said tapered actuator shaft for translating rotational drive torque from said elongate housing to said flexible inner shaft and said tapered actuator shaft, while permitting said flexible inner shaft to shift axially within said elongate housing, wherein said coupling means includes an axially elongate shaped surface on the inside of said elongate housing and a matingly shaped surface on an element fixed with said inner shaft and said tapered actuator shaft.

13. The flexible hardroll mandrel assembly of claim 12 wherein said elongate housing comprises a plurality of links including a drive link, at least one flex link and a cage extension, and wherein there is a flexure means between each link of said elongate housing.

14. The flexible hardroll mandrel assembly of claim 13 wherein said flexure means comprises a ball and socket flex joint wherein each said ball is elongated in a direction perpendicular to the longitudinal axis of said links, and each said socket is matingly shaped, thereby permitting pivotal movement in only a single plane.

15. The flexible hardroll mandrel assembly of claim 13 further including a stationary link for rotatably supporting and axially fixing said drive link thereto; wherein said flexible inner shaft also extends through said stationary link.

16. The flexible hardroll mandrel assembly of claim 15 including an expandable air cylinder provided to abut said stationary link and rotatably connected to another end of said flexible inner shaft for axially pulling said flexible inner shaft and said tapered actuator shaft, for permitting said roller to return within said roller cage after hardrolling is completed.

17. The flexible hardroll mandrel assembly of claim 15 wherein said end effector and drive means includes a stationary first gripper and a reciprocable second gripper for inserting said mandrel assembly in a sleeve to be expanded, said first gripper includes a nut setter which is driven by a motor means on said end effector for rotatably driving said drive link of said elongate housing.

18. The flexible hardroll mandrel assembly of claim 18 wherein said drive link includes an external tapered hex shaped surface to slide into and engage said nut setter for torque transfer.

19. The flexible hardroll mandrel assembly of claim 13 wherein said flexible inner shaft includes a plurality of non-flexing sleeves secured thereto of a number equal to the number of flexure means, and which are spaced to permit the inner shaft to flex during insertion and removal of the mandrel assembly, but which lock the flexure means during operation as the sleeves are shifted with the flexible inner shaft during operation.

20. A flexible hardroll mandrel assembly for expanding a sleeve, comprising:
   an elongate housing for transferring torque having a plurality of links including a drive link with an external torque transmitting surface, and a plurality of flexure means between each of said link;
   a roller cage rotatably mounted to a first end of said elongate housing, including a roller rotatably mounted within a slot in said roller cage;
   a tapered actuator shaft axially slidably supported in an opening in said roller cage for radially extending, orbiting and rotating said roller;
   an end effector and drive means including a drive element for rotatably driving said elongate housing by engagement between said drive element and said external torque surface of said drive link;
   a flexible inner shaft within said elongate housing connected at one end to said tapered actuator shaft to shift said tapered actuator shaft in response to axial movement of said inner shaft; and
   a coupling means provided on an internal surface of said elongate housing adjacent to said first end thereof which is slidably connected to said flexible inner shaft near the connection of said flexible inner shaft to said tapered actuator shaft for translating rotational drive torque from said elongate housing to said flexible inner shaft and said tapered actuator shaft, while permitting said flexible inner shaft to shift axially within said elongate housing, wherein said coupling means includes an axially elongate shaped surface on the inside of said elongate housing and a matingly shaped surface on an element fixed with said inner shaft and said tapered actuator shaft.

21. The flexible hardroll mandrel assembly of claim 20 wherein said elongate housing further comprises at least one flex link and a cage extension.

22. The flexible hardroll mandrel assembly of claim 21 wherein said flexure means comprises a ball and socket flex joint wherein each said ball is elongated in a direction perpendicular to the longitudinal axis of said links, and each said socket is matingly shaped, thereby permitting pivotal movement in only a single plane.

23. The flexible hardroll mandrel assembly of claim 21 further including a stationary link for rotatably supporting and axially fixing said drive link thereto; wherein said flexible inner shaft also extends through said stationary link.

24. The flexible hardroll mandrel assembly of claim 23 including an expandible air cylinder provided to abut said stationary link and rotatably connected to another end of said flexible inner shaft for axially pulling said flexible inner shaft and said tapered actuator shaft, for permitting said roller to return within said roller cage after hardrolling is completed.

25. The flexible hardroll mandrel assembly of claim 23 wherein said end effector and drive means includes a stationary first gripper and a reciprocable second gripper for inserting said mandrel assembly in a sleeve to be expanded, said first gripper includes a nut setter which is driven by a motor means on said end effector for rotatably driving said drive link of said elongate housing.

26. The flexible hardroll mandrel assembly of claim 11 wherein said drive link includes an external tapered hex shaped surface to slide into and engage said nut setter for torque transfer.

27. The flexible hardroll mandrel assembly of claim 21 wherein said flexible inner shaft includes a plurality of non-flexing sleeves secured thereto of a number equal to the number of flexure means, and which are spaced to permit the inner shaft to flex during insertion and removal of the mandrel assembly, but which lock the flexure means during operation as the sleeves are shifted with the flexible inner shaft during operation.

28. A flexible hardroll mandrel assembly for expanding a sleeve, comprising:
- an elongate housing for transferring torque having a plurality of links, including a drive link with an external torque transmitting surface, and a plurality of flexure means between each of said link;
- a roller cage rotatably mounted to a first end of said elongate housing, including a roller rotatably mounted within a slot in said roller cage;
- a tapered actuator shaft axially slidably supported in an opening in said roller cage for radially extending, orbiting and rotating said roller;
- an end effector and drive means including a drive element for rotatably driving said elongate housing by engagement between said drive element and said external torque surface of said drive link, said end effector and drive means further including a stationary first gripper and a reciprocable second gripper, wherein said first gripper has said drive element secured thereto;
- a flexible inner shaft within said elongate housing connected at one end to said tapered actuator shaft to shift said tapered actuator shaft in response to axial movement of said inner shaft, said flexible inner shaft includes a plurality of non-flexing sleeve secured thereto of a number equal to the number of flexure means, and which are spaced to permit the inner shaft to flex, but which lock the flexure means when axially shifted with the flexible inner shaft; and
- a coupling means provided on an internal surface of said elongate housing adjacent to said first end thereof which is slidably connected to said flexible inner shaft near the connection of said flexible inner shaft to said tapered actuator shaft for translating rotational drive torque from said elongate housing to said flexible inner shaft and said tapered actuator shaft, while permitting said flexible inner shaft to shift axially within said elongate housing, wherein said coupling means includes an axially elongate shaped surface on the inside of said elongate housing and a matingly shaped surface on an element fixed with said inner shaft and said tapered actuator shaft.

* * * * *